(12) United States Patent
Wirola et al.

(10) Patent No.: US 10,267,894 B2
(45) Date of Patent: *Apr. 23, 2019

(54) METHOD AND APPARATUS FOR DETERMINING QUALITY OF RADIO MAPS

(71) Applicant: HERE Global B.V., Eindhoven (NL)

(72) Inventors: Lauri Wirola, Tampere (FI); Laura Wirola, Tampere (FI); Jari Syrjarinne, Tampere (FI); Mikko Blomqvist, Lempäälä (FI)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/909,166

(22) Filed: Mar. 1, 2018

(65) Prior Publication Data

US 2018/0188348 A1 Jul. 5, 2018

Related U.S. Application Data

(63) Continuation of application No. 14/907,632, filed as application No. PCT/EP2014/063346 on Jun. 25, 2014, now Pat. No. 9,939,515.

(30) Foreign Application Priority Data

Jul. 31, 2013 (GB) .................................. 1313659.3

(51) Int. Cl.
*H04W 24/00* (2009.01)
*G01S 5/02* (2010.01)
(Continued)

(52) U.S. Cl.
CPC ............. *G01S 5/0252* (2013.01); *H04W 4/02* (2013.01); *H04W 24/10* (2013.01); *H04W 84/12* (2013.01)

(58) Field of Classification Search
CPC ....... G01S 5/0252; H04W 24/10; H04W 4/02; H04W 84/12
(Continued)

(56) References Cited

U.S. PATENT DOCUMENTS 8,977,287 B1 3/2015 Gold et al.
9,432,813 B2 8/2016 Ahn et al.
(Continued)

FOREIGN PATENT DOCUMENTS

CN 101953197A A 1/2011
CN 102770780A A 11/2012
(Continued)

OTHER PUBLICATIONS

Chinese Office Action for related Chinese Application No. 201480043095.3 dated Dec. 1, 2016, with English Translation.
(Continued)

*Primary Examiner* — Amancio Gonzalez
(74) *Attorney, Agent, or Firm* — Lempia Summerfield Katz LLC

(57) ABSTRACT

In accordance with an example embodiment of the present invention, an apparatus comprises a processor configured to determine a first result of estimating a position based at least in part on a first partial radio map, the processor further configured to perform a first comparison of the first result to a reference position, and a memory configured to store a second result based upon the comparison.

21 Claims, 5 Drawing Sheets

(51) Int. Cl.
*H04W 4/02* (2018.01)
*H04W 24/10* (2009.01)
*H04W 84/12* (2009.01)

(58) Field of Classification Search
USPC ...................................................... 455/456.1
See application file for complete search history.

(56) References Cited

U.S. PATENT DOCUMENTS

| | | | |
|---|---|---|---|
| 9,939,515 B2* | 4/2018 | Wirola | ................. G01S 5/0252 |
| 2004/0203885 A1 | 10/2004 | Quaid | |
| 2008/0176583 A1 | 7/2008 | Brachet et al. | |
| 2010/0324813 A1 | 12/2010 | Sundararajan et al. | |
| 2011/0176494 A1 | 7/2011 | Huang et al. | |
| 2015/0230100 A1 | 8/2015 | Atia et al. | |

FOREIGN PATENT DOCUMENTS

| | | |
|---|---|---|
| CN | 103039115A A | 4/2013 |
| WO | WO2011088239 A2 | 7/2011 |
| WO | 2012095922 A1 | 7/2012 |

OTHER PUBLICATIONS

Chinese Office Action for related Chinese Application No. 201480043095.3 dated Oct. 9, 2017, with English Translation.
European Office Action for related European Application No. 14732233.3 dated Apr. 13, 2017.
European Search Report for related European Application No. 14732233.3 dated Jan. 24, 2018.
International Preliminary Report on Patentability cited in PCT/EP2014/063346, dated Feb. 2, 2016.
International Search Report cited in PCT/EP2014/083348, dated Sep. 19, 2014.

* cited by examiner

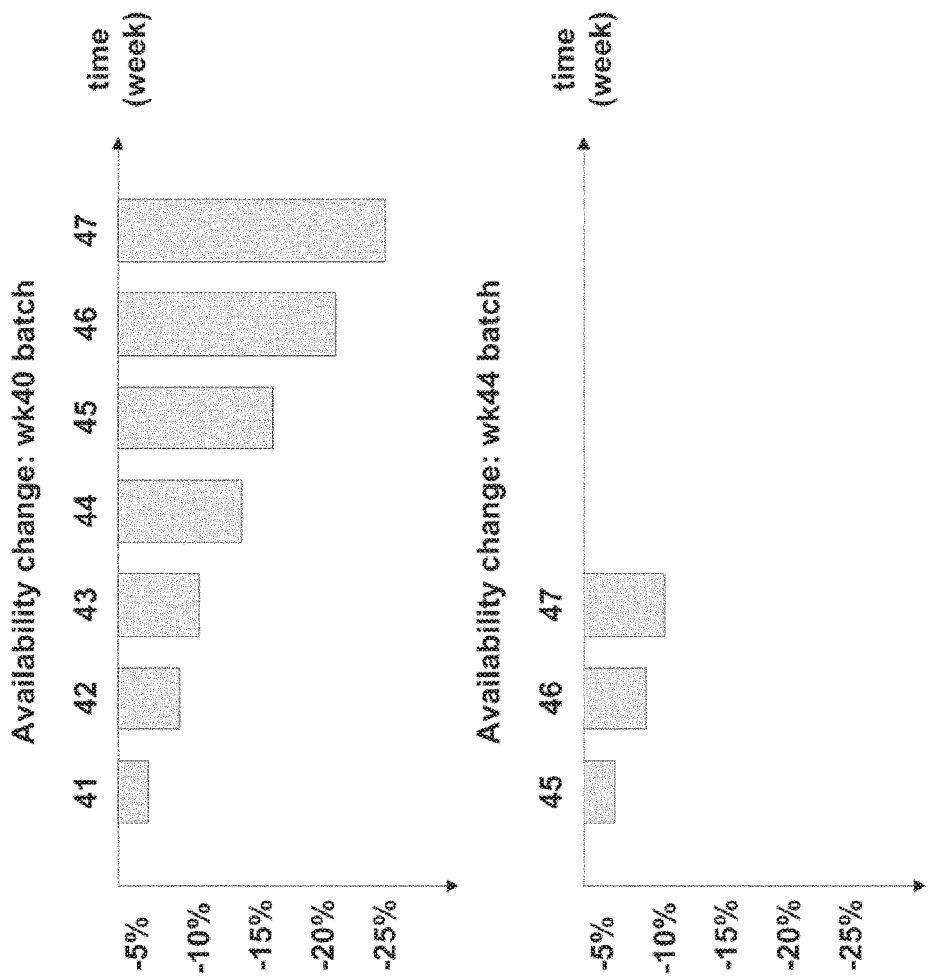

METHOD AND APPARATUS FOR DETERMINING QUALITY OF RADIO MAPS

TECHNICAL FIELD

This application is a continuation under 35 U.S.C § 120 and 37 C.F.R. § 1.53(b) of U.S. patent application Ser. No. 14/907,632 filed Jan. 26, 2016, which was filed under 35 U.S.C. § 371 and claiming benefit of PCT Application No. PCT/EP2014/063346, filed on Jun. 25, 2014, which claims the benefit of GB 1313659.3, filed on Jul. 31, 2013, the contents of each of which are incorporated herein by reference.

BACKGROUND

Modern global cellular and non-cellular positioning technologies are based on generating large global databases containing information on cellular and non-cellular signals. The information may originate entirely or partially from users of these positioning technologies. This approach may also be referred to as "crowd-sourcing".

Information provided by users may be in the form of "fingerprints", which contain a location that is estimated based on, for example, received satellite signals of a global navigation satellite system, GNSS, and measurements taken from one or more radio interfaces for signals of a cellular and/or non-cellular terrestrial system. A location may comprise an area surrounding a geographical position, for example. In the case of measurements on cellular signals, the results of the measurements may contain a global and/or local identification of the cellular network cells observed, their signal strengths and/or path losses and/or timing measurements like timing advance, TA, or round-trip time. For measurements on wireless local area network, WLAN, signals, as an example of signals of a non-cellular system, the results of the measurements may contain at least one of a basic service set identification, BSSID, like the medium access control, MAC, address of observed access points, APs, the service set identifier, SSID, of the access points, and the signal strengths of received signals. A received signal strength indication, RSSI, or physical reception level may be expressed in dBm units with a reference value of 1 mW, for example.

Such data may then be transferred to a server or cloud, where the data may be collected and where further models may be generated based on the data for positioning purposes. Such further models can be coverage area estimates, communication node positions and/or radio channel models, with base stations of cellular communication networks and access points of WLANs being exemplary communication nodes. In the end, these refined models, also known as radio maps, RM, may be used for estimating the position of mobile terminals.

Fingerprints do not necessarily have to comprise a GNSS based position. They may also include cellular and/or WLAN measurements only. In this case the fingerprint could be assigned a position for example based on a WLAN based positioning in a server. Such self-positioned fingerprints can be used to learn cellular network information, in case there are cellular measurements in the fingerprint. Moreover, in a set of WLAN measurements in a fingerprint there may be, in addition to measurements for known WLAN access points, also measurements for unknown access points and the position of the unknown access points can be learned through these self-positioned fingerprints. Finally, more data can be learnt of previously known access points based on self-positioned fingerprints.

It may be noted that even when using a mobile terminal having GNSS-capabilities, a user may benefit from using cellular/non-cellular positioning technologies in terms of time-to-first-fix and power consumption. Also, not all applications require a GNSS-based position. Furthermore, cellular/non-cellular positioning technologies work indoors as well, which is generally a challenging environment for GNSS-based technologies.

SUMMARY

Various aspects of examples of the invention are set out in the claims.

According to a first aspect of the present invention, an apparatus comprises a processor configured to determine a first result of estimating a position based at least in part on a first partial radio map, the processor further configured to perform a first comparison of the first result to a reference position, and a memory configured to store a second result based upon the comparison.

According to a second aspect of the present invention, a method comprises determining a first result of estimating a position based at least in part on a first partial radio map, and performing a first comparison of the first result to a reference position.

According to a third aspect of the present invention, a method comprises determining a first result of estimating a position based at least in part on a first partial radio map, performing a first comparison of the first result to a reference position, determining a third result of estimating the position based at least in part on a second partial radio map, performing a second comparison of the third result to the reference position, and determining a quality of the first partial radio map relative to a quality of the second partial radio map based at least in part on the first comparison and the second comparison.

According to further aspects of the present invention, computer programs are provided that are configured to cause methods in accordance with the second and third aspects to be performed.

BRIEF DESCRIPTION OF THE DRAWINGS

For a more complete understanding of example embodiments of the present invention, reference is now made to the following descriptions taken in connection with the accompanying drawings in which:

FIG. 5 demonstrates how quality of two batches of partial radio maps may be compared, according to an embodiment of the invention.

DETAILED DESCRIPTION OF THE DRAWINGS

Figure 1:
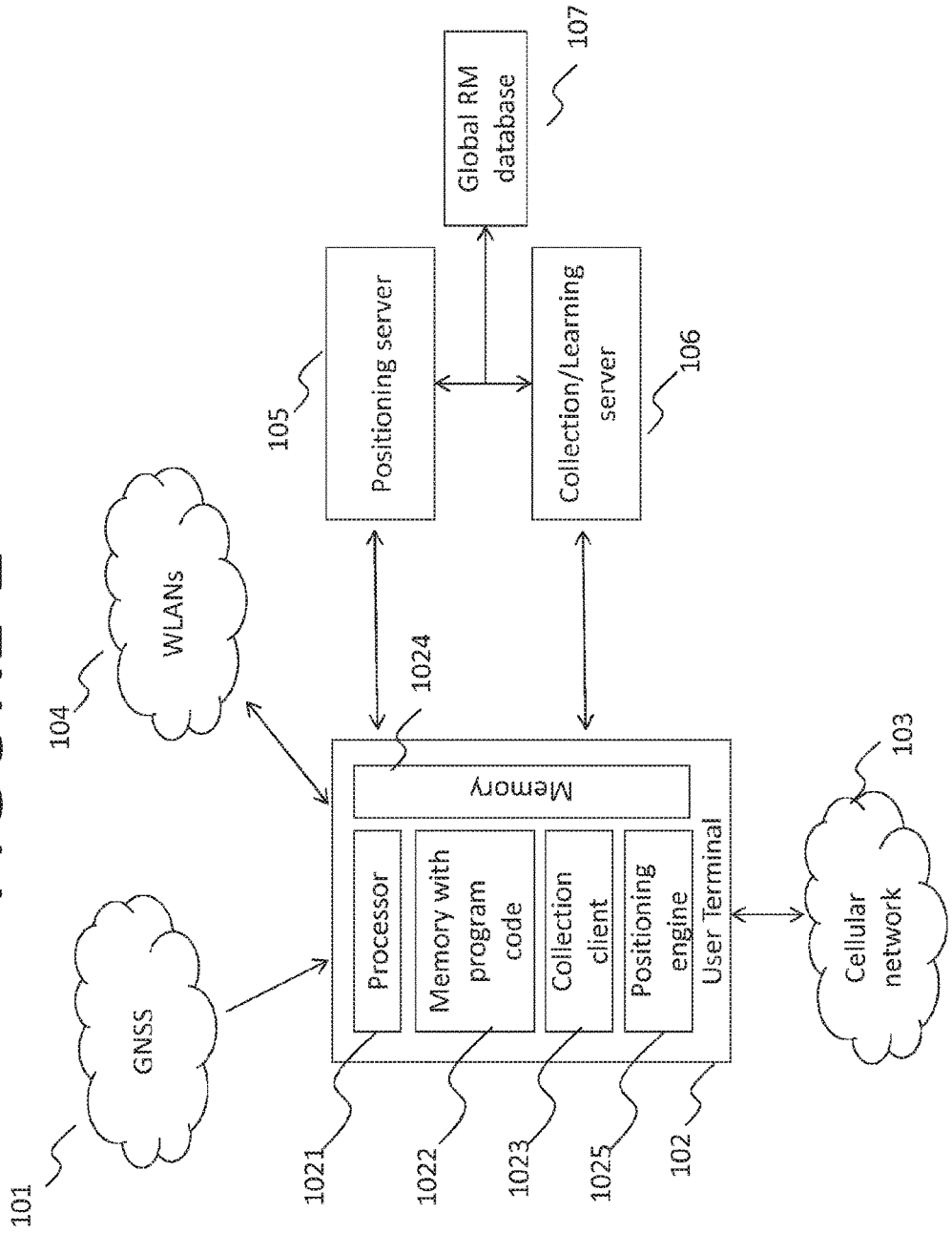
FIG. 1 shows an example architecture of a positioning system.

Positioning systems may function in two modes. The first mode is a terminal-assisted mode, in which a terminal performs measurements of cellular and/or non-cellular air interface signals and provides results of the measurements to a positioning server hosting a global cellular and/or non-cellular RM database. The server then provides a position estimate back to the terminal. This methodology is called online positioning and requires the terminal to have data connectivity whenever positioning service is needed.

The second mode is a terminal-based mode, an offline positioning technique, in which a terminal has a local copy of a RM, called a partial RM. This partial RM is a subset of the global RM in form of WLAN RM offline files, for example. These files may be in the form of a database or any other form that is readable by a computer. There may be multiple such files, since it may be advantageous not to have a single global file, but several smaller ones so that the terminal may only download partial RM for a specific area, for example, a country or a city where a need for positioning is anticipated. This subset can also be pre-installed on the terminal. Offline positioning techniques do not require the terminal to have data connectivity whenever positioning service is needed.

Offline positioning may be advantageous from a service perspective because it helps reduce load on positioning servers. Also, since the terminals are capable of positioning themselves without contacting a positioning server, the terminals may remain location aware all the time. Additionally, time-to-first-fix may be very short, since the device does not need to contact the server.

WLAN RM offline files can be very large in size. As an example, in an urban/suburban area covering roughly 10×10 km, there can be more than 10 million APs. This results in an average density of one AP every 10 m$^2$ or 400,000 APs per 2×2 km tile. Transferring location information for each of these APs from a server to a terminal consumes a lot of server resources, network bandwidth, storage space in the terminal and it can also be quite expensive to the consumer in the form of data charges. In addition, WLAN AP environments may be highly dynamic and new APs may appear, existing APs may become obsolete and AP locations may change, for example. Resultantly, radio maps installed on a device may need to be refreshed, possibly more than once, with their newer versions. Hence, it is preferable to have small WLAN RM offline files.

To reduce size of a radio maps and corresponding WLAN RM offline files, those APs which do not significantly affect any of accuracy, availability and consistency of a radio map may be excluded from the radio map. Availability of a positioning system is defined as the ratio of the number of successful positioning events to the total number of positioning requests. Consistency of a positioning system is a measure of a quality of its uncertainty estimate. An estimate of a location based upon a radio map may not be a point but rather it may be an area, also known as an uncertainty area, centered at a point such that the true location is estimated to be comprised with the uncertainty area. An uncertainty area of a radio map may be a circle or an ellipse, for example. Consistency of a positioning system indicates how likely it is that a true location will be comprised within an uncertainty area. Consistence may be expressed in percentage. For example, a 95% level of consistency implies that a true location will fall inside an indicated uncertainty area in 95% of the cases. It can be appreciated that accuracy, availability and consistency are important metrics affecting user experience. A further reduction in size of a partial radio map file may be achieved by compressing identifiers of APs comprised in the partial radio map, into less number of bits by utilizing a digital compression algorithm. But even after excluding APs from a partial radio map and utilizing compressed AP identifiers, sizes of partial radio map files may still be prohibitively big for frequent downloads by user terminals. Thus, it is desirable to avoid downloading a newer version of a partial radio map to a user terminal as much as possible, while still maintaining an acceptable level of accuracy and availability in offline positioning.

Embodiments of the present invention relate to comparing positioning output of a partial radio map to a reference location and based upon the comparison, determining whether a new partial radio map should be downloaded by a user terminal or not. Another embodiment of the invention relates to comparing a positioning output of a first partial radio map to a reference location and comparing a positioning output of a second partial radio map to the same reference location and based upon the comparisons, determining a relative quality of the two partial RMs.

FIG. 1 shows an example architecture of a positioning system. The positioning system of FIG. 1 comprises a GNSS 101, a user terminal 102, a cellular network 103. WLAN systems 104, a positioning server 105, a collection/learning server 106 and a global RM database 107. Positioning server 105 and collection/learning server 106 may be co-located in a single site or apparatus, or alternatively they may be distinct in the sense that positioning server 105 is external to collection/learning server 106 and collection/learning server 106 is external to positioning server 105. Global RM database may be a standalone node, or it may be comprised in collection/learning server 106 and/or positioning server 105. The user terminal 102 may receive its GNSS based position from the GNSS 101. The GNSS could be GPS, GLONASS or any other satellite based navigation system. The user terminal may also receive radio signals from the cellular network 103. The cellular network 103 could be based on any kind of cellular system, for instance a GSM system, a 3rd Generation Partnership Project, 3GPP, based cellular system like a WCDMA system or a time division synchronous CDMA, TD-SCDMA, system. for example supporting high speed packet access, HSPA, a 3GPP2 system like a CDMA2000 system, a long term evolution, LTE, or LTE-Advanced system, or any other type of cellular system, like a WiMAX system. Cellular network 103 comprises a plurality of base stations or base transceiver stations as communication nodes. Furthermore, user terminal 102 may also receive signals from WLANs 104. WLANs 104 comprise at least one access point as a communication node. WLANs 104 may be based upon the IEEE 802.11 standards, for example.

The user terminal 102 comprises a processor 1021, and linked to the processor, a memory 1022. Memory 1022 stores computer program code in order to cause the user terminal 102 to perform desired actions. Processor 1021 is configured to execute computer program code stored in memory 1022. The user terminal further comprises memory 1024 to store additional data such as, for example, partial RMs. The user terminal may further include at least one antenna in communication with at least one transmitter and at least one receiver to enable communication with the GNSS 101, cellular network 103, WLANs 104, positioning server 105 and collection/learning server 106. The mobile terminal processor 1021 may be configured to provide signals to and receive signals from the at least one transmitter and the at least one receiver, respectively.

Although not shown, the user terminal 102 may also include one or more other means for sharing and/or obtaining data. For example, the apparatus may comprise a short-range radio frequency, RF, transceiver and/or interrogator so data may be shared with and/or obtained from electronic devices in accordance with RF techniques. The user terminal may comprise other short-range transceivers, such as, for example, an infrared, IR, transceiver, a Bluetooth™ BT, transceiver operating using Bluetooth™ brand wireless technology developed by the Bluetooth™ Special Interest Group, a wireless universal serial bus, USB, transceiver and/or the like. The Bluetooth™ transceiver may be capable of operating according to low power or ultra-low power Bluetooth™ technology, for example, Bluetooth low energy, radio standards. In this regard, the user terminal 102 and, in particular, the short-range transceiver may be capable of transmitting data to and/or receiving data from electronic devices within proximity of the apparatus, such as within 10 meters, for example. The apparatus may be capable of transmitting and/or receiving data from electronic devices according to various wireless networking techniques, including 6LoWpan, Wi-Fi, Wi-Fi low power, IEEE 802.15 techniques, IEEE 802.16 techniques, and/or the like.

The user terminal further comprises a collection client 1023. Collection client 1023 may comprise, for example, a software module stored in memory 1022, or in another memory comprised in user terminal 102. The collection client 1023 may be configured to collect information comprising at least one of the following to be sent to the collection/learning server 106:

An estimate of the user terminal's location based on, for example, received satellite signals of the GNSS 101

Measurements taken from signals of the cellular network 103.

Results of scanning of WLAN systems 104.

Results of scanning of other short range radio signals.

The collection/learning server 106 receives this information and based on it, builds a database of AP locations and coverage areas of cellular base stations and APs, such as for example WLAN APs. Such a database may be called a global RM database 107 since the RMs stored in this database may not be specific to a country or a city. Rather, they may be global in nature. In some embodiments, collection/learning server 106 is configured to build a database of AP locations that does not comprise information on coverage areas of cellular base stations.

Once a reliable global RM database 107 is built, the positioning server 105 may serve online positioning requests from user terminals. A user terminal may take measurements of signals from cellular networks and/or perform WLAN scans and send them to the positioning server 105. The positioning server may refer to the global RM database and based at least in part upon the information provided by the user terminal, provide an estimate of the user terminal position.

If a data connection between the positioning server and a user terminal is unavailable or is undesirable, the terminal may rely on the positioning engine 1025 to serve positioning requests offline. A partial RM or a subset of the global RM in form of RM offline files, such as for example WLAN offline files, may be stored in the memory 1024 of the user terminal. With a partial RM pertaining to the area in which a user terminal is presently located stored in a memory of the user terminal, the user terminal may scan the WLANs and/or signals from cellular networks at its location and provide a list of observed AP identifiers and/or base stations identities to the positioning engine 1025. After consulting a partial RM stored in the user terminal 102 and based upon the observed AP identifiers and/or the base station identities, the positioning engine 1025 may estimate a location of the user terminal without sending a request to a positioning server. It should be noted that partial RMs may be based upon access points of short range wireless systems other than WLAN systems and a user terminal may scan for signals from at least one of these other short range wireless systems to estimate its position.

Figure 2:
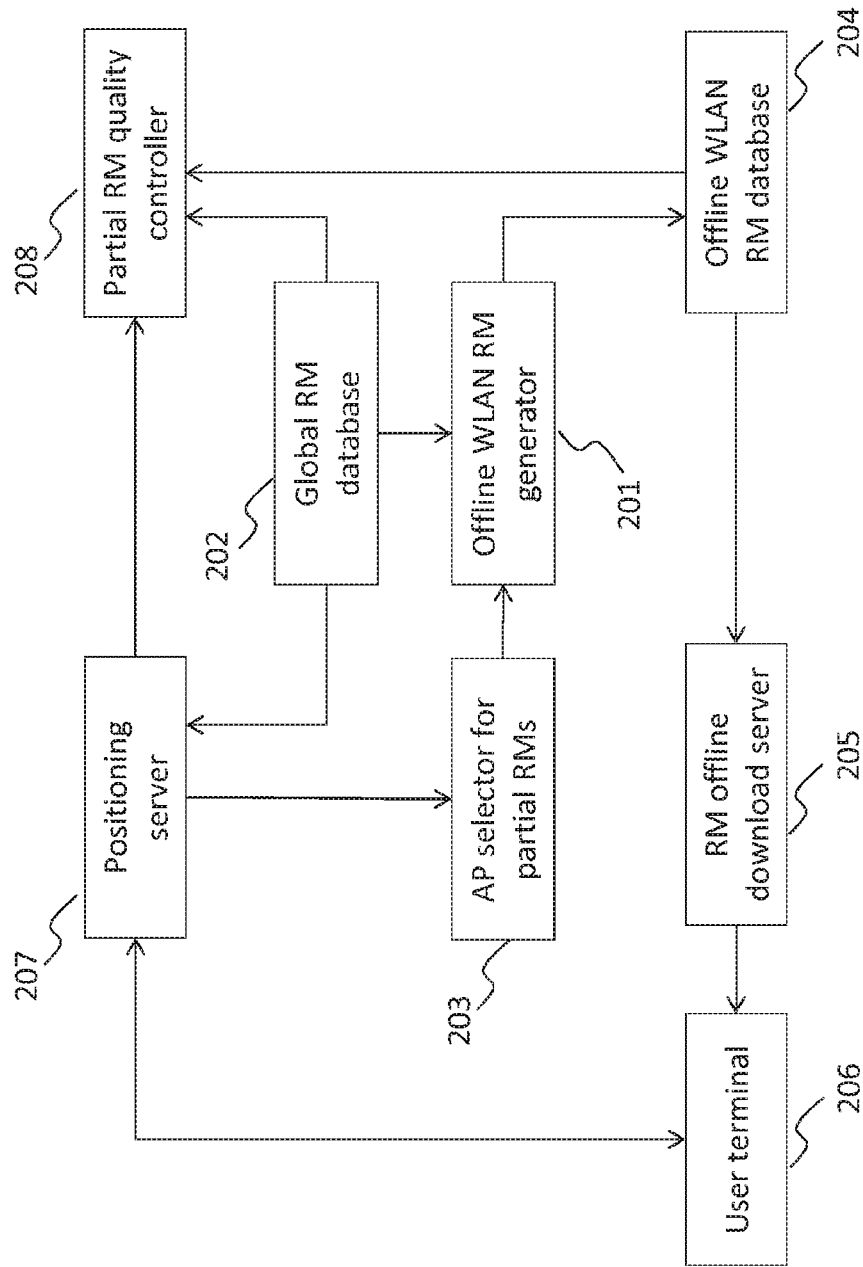
FIG. 2 shows an example system for generating and distributing partial RMs for offline usage in user terminals.

FIG. 2 shows an example system for generating and distributing partial RMs for offline usage in user terminals. In accordance with an embodiment of the present invention, an offline WLAN RM generator, OW-RMG, 201 takes as inputs a global RM from a global RM database 202 and a list of WLAN APs to be included in a partial RM from an AP selector for partial RMs 203. In order to reduce a size of a partial RM, it is desirable to include only a subset of all APs in a partial RM to be stored on a user terminal. The AP selector for partial RMs 203 helps achieve this goal by identifying APs which are relevant to the performance of partial RMs. The AP selector for partial RMs 203 may comprise a memory. The selection of APs by the AP selector for partial RMs 203 may be based at least in part on APs observed by a user terminal 206. The OW-RMG 201 may further refine the list of APs received from the selector 203 based upon a set of at least one criterion. The OW-RMG 201 may compress identifiers of a subset of APs in order to reduce a size of a partial RM file. The OW-RMG 201 generates partial RMs based upon these inputs and transfers them for storage to the offline WLAN RM database 204. The partial RMs needed by the user terminal 206 are then transferred by the offline WLAN RM database 204 to the RM offline download server 205. In an embodiment of the invention, the offline WLAN RM database 204 may be comprised within the OW-RMG 201. The offline WLAN RM database may store partial RM belonging to different batches. Herein, a batch refers to a version of a partial radio map file. For example, a batch may comprise partial RMs created during a certain time period, for example. In an embodiment of the invention, partial RM files are generated on a monthly basis such that there may be a "September batch" of partial RMs, an "October batch" of partial RMs and a "November batch" of partial RMs, for example. In another example embodiment, there may be a week 40 batch of partial RMs, comprising partial RMs generated during week 40 of a year, or a week 44 batch of partial RMs, comprising partial RMs generated during week 44 of a year, for example.

From the download server, a partial RM file may be downloaded by the user terminal 206 or any other user terminal. The user terminal may have the structure and circuitry of user terminal 102 of FIG. 1, for example. The user terminal may include at least one antenna in communication with at least one transmitter and at least one receiver to enable communication with the download server. Similarly, the download server may include at least one antenna in communication with at least one transmitter and at least one receiver to enable communication with the user terminal. The download server may further include a processor configured to provide signals to and receive signals from the transmitter and receiver, respectively.

In an embodiment of the invention, the user terminal 206 may transmit a request for online positioning to the positioning server 207. The request for online positioning may contain a list of APs observed by the user terminal at a location. The list may comprise just one AP or it may comprise more than one APs. The location may comprise an area surrounding a geographical position, for example. The list of APs may comprise a list of at least one AP identity. An AP identity may comprise a service set identification, SSID, and/or a basic service set identifier, BSSID. In some embodiments, the list comprises identities of base stations. The positioning server obtains a global RM from the global RM database 202, estimates a location of the user terminal based upon the global RM and the list of APs, and sends the location estimate back to the user terminal. The positioning server 207 may also send the list of APs and/or the location estimate to the partial RM quality controller 208. If the positioning server sends only the list of APs but not the location estimate to the partial RM quality controller 208, the partial RM quality controller may itself determine a location estimate based upon the list of APs received from the positioning server 207 and a global RM obtained from the global RM database 202. The partial RM quality controller 208 may also obtain partial RMs belonging to different batches from the offline WLAN RM database 204. Based upon partial RMs belonging to different batches and the list of APs received from the positioning server, the partial RM quality controller 208 may generate estimates of the location based upon partial RMs of different batches. Comparing these location estimates to the location estimate based upon a global RM, statistics reflecting positioning availability and positioning accuracy of partial RMs of a certain batch when compared to a global RM, may be generated. These statistics may also be used to compare a relative quality of partial RMs from different batches. Finally, these statistics may be used to determine whether a user terminal should update its partial RM or not.

Global RM database 202, AP selector for partial RMs 203, Offline WLAN RM generator 201, Offline WLAN RM database 204, RM offline download server 205, positioning server 207 and partial RM quality controller 208 may be implemented as standalone nodes in a network, or alternatively at least two and optionally even all of them may be implemented as functions in a single physical server.

Figure 3:
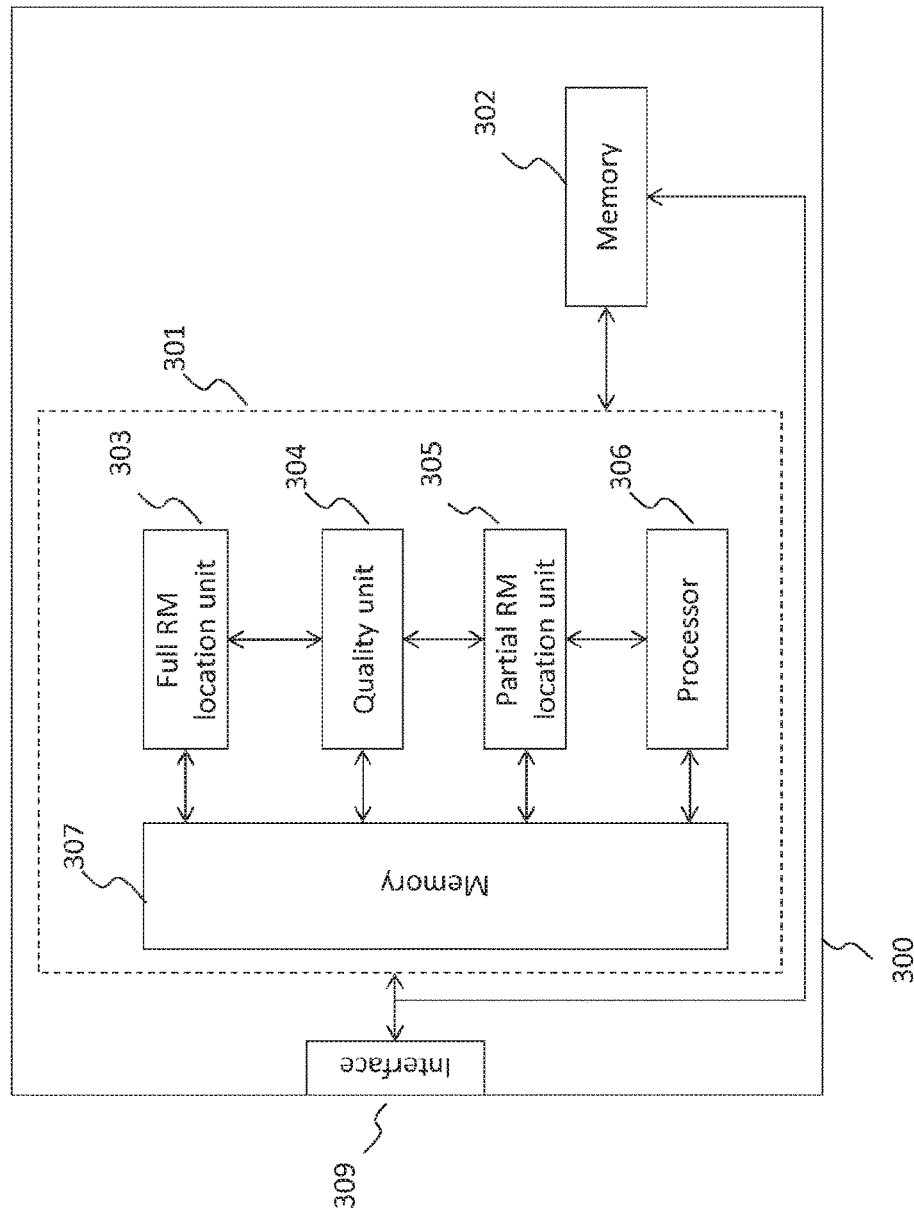
FIG. 3 shows an apparatus embodying a process for determining a quality of a partial radio map according to an example embodiment of the invention.

FIG. 3 shows an apparatus embodying a process for determining a quality of a partial RM according to an example embodiment of the invention. As an example, apparatus 300 may be comprised in the partial RM quality controller 208 of FIG. 2. Apparatus 300 comprises processors 301, 303, 304, 305, 306 and, linked to these processors, a memory 307. The processors 301, 303, 304, 305, 306 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. A processor comprising exactly one processing core may be referred to as a single-core processor, while a processor comprising more than one processing core may be referred to as a multi-core processor. Accordingly, although illustrated in FIG. 3 as single processors, in some embodiments the processors 303, 304, 305, 306 may comprise a plurality of processors or processing cores. Similarly, processors 303, 304, 305, 306 may be embodied within one processor 301. In some embodiments, at least one of processors 303, 304, 305 and 306 are implemented at least in part in software, which software may be run on processor 301. Memory 307 stores computer program code for supporting determining a quality of a partial RM. Processors 301, 303, 304, 305, 306 are configured to execute computer program code stored in memory 307 in order to cause the apparatus to perform desired actions. Apparatus 300 further comprises memory 302. Memory 302 may be used, at least in part, to store input data needed for operations of the apparatus 300 or output data resulting from operation of the apparatus 300. Apparatus 300 could be comprised in a server or any other suitable device. Apparatus 300 could equally be a module, like a chip, circuitry on a chip or a plug-in board, for use in a server or for any other device. Optionally, apparatus 300 could comprise various other components, such as for example at least one of a user interface, a further memory and a further processor. Memory 302 and memory 307 may be distinct memories, or alternatively memory 307 may be comprised in memory 302, or memory 302 may be comprised in memory 307.

Interface 309, which may be a data interface, receives a list of APs that a user terminal has detected at a location. The list may comprise just one AP or it may comprise more than one APs. The location may comprise an area surrounding a geographical position, for example. The set of APs may comprise a list of at least one AP identity. An AP identity may comprise a service set identification, SSID, and/or a basic service set identifier, BSSID. In some embodiments, the list comprises identities of base stations. The list of APs may be comprised in an online positioning request transmitted by a user terminal to a positioning server, such as positioning server 207 of FIG. 2, for example. The list of APs is transmitted by the interface 309 to the partial RM location unit 305. Interface 309 may also receive further information, such as signal strengths of received radio signals, and transmit to the partial RM location unit 305. The partial RM location unit 305 may further receive a partial RM from a database such as the offline WLAN RM database 204 of FIG. 2, for example. In another embodiment of the invention, the partial RM location unit 305 may receive a partial RM from a memory comprised in the apparatus 300, such as memory 302, or it may receive the partial RM from the interface 309. Interface 309 may receive the partial RM from a memory not comprised in the apparatus 300, such as memory comprised in the offline WLAN RM database 204 of FIG. 2, for example. Based upon the list of APs and a partial RM, the partial RM location unit 305 estimates a location where the list of APs was detected. A result of the estimation may be a valid estimate of the location or an invalid estimate of the location. An invalid estimate is said to result if the estimation is unsuccessful, thereby yielding no position estimate, for example. A result of the estimation may be stored in a memory location or it may be transmitted to the quality unit 304. In case no valid estimate of the location is obtained, the partial RM location unit 305 may transmit an indication to the quality unit 304 that a valid estimate based upon a partial RM was not obtained. In case a valid estimate of the location is obtained, the partial RM location unit 305 may transmit the estimate to the quality unit 304.

The full RM location unit 303 obtains an estimate of a location where the list of APs was detected, based upon a full RM. The estimate based upon a full RM may be called a reference position. A full RM is a RM from which the partial RM used by the partial RM location unit 305 was derived. The full RM may contain a higher number of APs compared to the partial RM, for example. The full RM location unit 303 may obtain the estimate based upon a full RM from the interface 309. The interface 309 may receive the estimate based upon full RM from a positioning sever, such as positioning server 207 of FIG. 2, for example. In another embodiment of the invention, the full RM location unit 303 may obtain a copy of the full RM and may estimate a location where the list of APs was detected, based upon the full RM and the list of APs. The full RM location unit 303 may obtain a copy of the full RM from a memory comprised in the apparatus 300, such as memory 302, or it may receive the full RM via the interface 309. Interface 309 may receive the full RM from a memory not comprised in the apparatus 300, such as memory comprised in the global RM database 202 of FIG. 2, for example. If a result of the estimation is a valid estimate of the location, the full RM location unit 303 transmits the estimate of the location to the quality unit 304. In case no valid estimate of the location is obtained, the full RM location unit 303 may transmit an indication to the quality unit 304 that a valid estimate based upon a full RM was not obtained.

The quality unit 304 receives an estimate of a location based upon a full RM from the full RM location unit 303 and an estimate of the location based upon a partial RM from the partial RM location unit 305, and compares the two estimates. A result of the comparison may be the distance between the two estimates. Another result of the comparison may be a determination of whether the estimate based upon the full RM is comprised within an uncertainty area of the estimate based upon the partial RM or not. Another result of the comparison may be an indication as to whether a valid estimate of the position was obtained or not. In case a valid estimate of a location based upon a partial RM was not obtained, but a valid estimate of the position based upon a full RM was obtained, a result of the comparison may be an indication to this effect. In case a valid estimate of a location based upon a partial RM was obtained, but a valid estimate of the position based upon a full RM was not obtained, a result of the comparison may be an indication to this effect. A situation when a valid estimate of a location based upon a partial RM may be obtained, but a valid estimate of the position based upon a full RM may not be obtained may arise when an outlier AP is excluded from the partial RM but is comprised in the full RM, for example. An AP may be an outlier if it is located so far away from other APs in a list of APs that its inclusion in position determination will be meaningless. For example, if there are five APs in the list and one of them is location 1000 km away from the others, it may be excluded.

A quality of the partial RM relative to the full RM may be determined based upon a comparison of the estimates. For example, if a difference between an estimate based upon a partial RM and an estimate based upon a full RM is small, the partial RM may be determined to have good quality. Also, if a valid estimate of a location was obtained with a full RM but an invalid estimate was obtained using a partial RM, the partial RM may be determined to have poor quality.

In an embodiment of the invention, the quality unit 304 may determine a relative quality of two partial RMs, based at least in part on comparison of location estimates based upon the two partial RMs with a location estimate based upon a full RM. For example, the partial RM location unit 305 may send a first and a second location estimate to the quality unit 305. The first location estimate may be based upon a first partial RM and the second estimate may be based upon a second partial RM. The first partial RM may be generated correspond to a geographical area and a second partial RM may be generated corresponding to the same geographical area, but after an interval of time, say one week. The quality unit 304 may compare the first location estimate to an estimate based upon a full RM and store a first result of the comparison. The first result may be a distance between the first location estimate and the estimate based upon a full RM. The quality unit 304 may further compare the second location estimate to the estimate based upon the full RM and store a second result of the comparison. The second result may be a distance between the second location estimate and the estimate based upon a full RM. The quality estimate may compare the first result and the second result and may determine a relative quality of the first partial RM and the second partial RM. For example, if the distance between the first location estimate and the estimate based upon a full RM and less than the distance between the second location estimate and the estimate based upon the full RM, the first partial RM may be determined to have a better quality compared to the second partial RM.

In another embodiment of the invention, the quality unit 304 determines that a first partial RM has better quality compared to the second RM if a valid estimate of a location is obtained based upon the first partial RM and a valid estimate of the location was not obtained based upon the second partial RM.

In some embodiments of the invention, a location estimate may be an average of several location estimates, each corresponding to a different list of APs. Two lists of APs may be considered different if even one AP is different between the two lists.

In an embodiment of the invention, the full RM location unit may provide an estimate of the location based upon signal from a GNSS, for example.

In an embodiment of the invention, the quality unit 304 may cause a positioning client to download a partial RM, based at least on a comparison of a quality of a partial RM with a quality of a full RM or with quality of another partial RM. The positioning client may be comprised in a user terminal.

Figure 4:
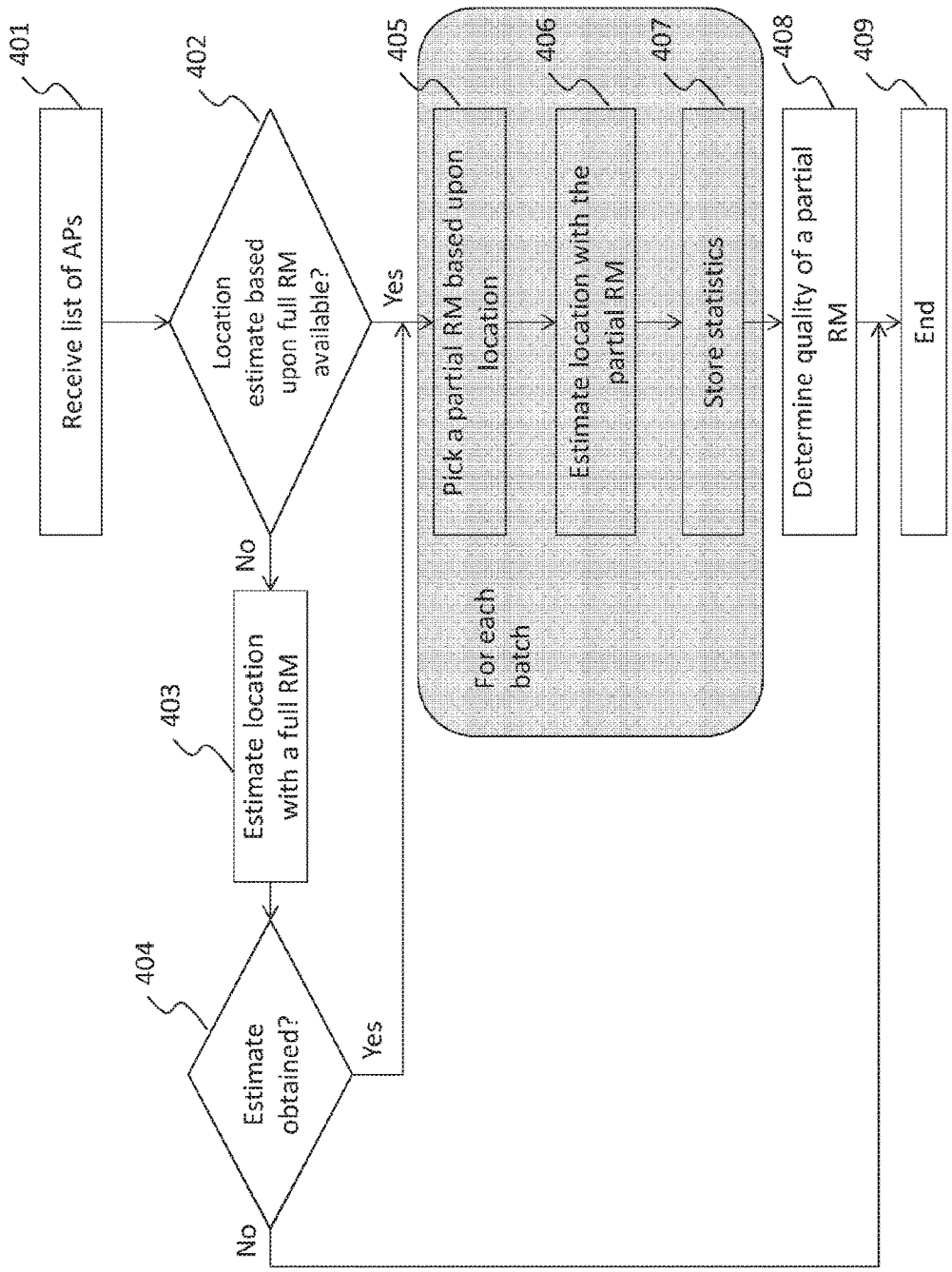
FIG. 4 is a flow diagram showing operations for determining quality of partial radio maps in accordance with at least one embodiment of the invention.

FIG. 4 is a flow diagram showing operations for determining quality of partial RMs in accordance with at least one embodiment of the invention. The method may be executed by an apparatus, such as apparatus 300 of FIG. 3, for example. In step 401, a list of APs observed by a user terminal at a location is received. The location may comprise an area surrounding a geographical position, for example. The list of APs may comprise just one AP or it may comprise more than one APs. The list of APs may comprise a list of at least one AP identity. An AP identity may comprise a service set identification, SSID, and/or a basic service set identifier, BSSID. The list of APs may be comprised in an online positioning request transmitted by a user terminal to a positioning server, such as positioning server 207 of FIG. 2. In step 402, it is determined whether an estimate of the location where the APs comprised in the list of APs were observed, based upon a full RM, is available. A full RM is a global RM which is likely to result in most accurate positioning estimate and highest availability, among all RMs. An estimate based upon a full RM may be called a reference position, for example. If an estimate based upon a full RM is available, the process proceeds to step 405, else the process proceeds to step 403. In step 403, an estimate of the location based upon the full RM is determined. In step 404, if a valid estimate of the location was obtained, the process moves to step 405. Else if a valid estimate was not obtained by utilizing a full RM, the process proceeds to step 409, where it terminates.

In step 405, a partial RM is selected from a batch of partial RMs such that the selected partial RM corresponds to the location where the APs received in step 401 were observed. In step 406, an estimate of the location is determined based upon the list of APs received in step 401 and the partial RM selected in step 405. The estimate may be a valid estimate of the location or the estimate may be invalid. In step 407, the location estimate determined in step 406 is compared with the location estimate based upon a full RM and statistics resulting from the comparison are stored in a memory. For example, if a valid estimate of the location was obtained in step 405, the statistics may comprise a difference between a location estimate based upon the partial RM and the location estimate based upon a full RM, for example. In another embodiment of the invention, the statistics may comprise an indication of whether the estimate based upon the full RM is comprised within an uncertainty area of the estimate based upon the partial RM or not. In yet another embodiment of the invention, the statistics may comprise an indication of whether a valid estimate of location based upon a partial RM was obtained or not.

If a valid estimate was not obtained in step 405, the statistics may comprise an indication that a valid estimate was not obtained based upon a partial RM, for example. Note that other statistics can also be utilized and the invention is not restricted to statistics described herein.

In another embodiment of the invention, the process of FIG. 4 may be repeated for a plurality of lists of APs such that statistics computed in step 407 may be averaged over the plurality of lists of APs.

In step 408, based upon the statistics determined in step 407, a quality of a partial RM compared to a full RM may be determined. Based upon the determined quality of a partial RM, it may be determined where a user terminal utilizing the partial RM needs to download a newer version of the partial RM, such as one from a newer batch, for example.

In another embodiment of the invention, steps 405, 406 and 407 may be repeated for a plurality of batches of partial RMs such that qualities of partial RMs belonging to different batches may be compared. For example, partial RMs comprised in a first batch and a second batch may be compared based upon a difference between location estimates based upon partial RMs from the first and the second batch and the location estimate based upon a full RM.

In an embodiment of the invention, a first partial RM may be determined to have a better quality compared to a second RM if a valid estimate of a location is obtained based upon the first partial RM and a valid estimate of the location was not obtained based upon the second partial RM. In another embodiment of the invention, statistics corresponding to a first partial RM may be compared to statistics corresponding to a second partial RM to determine a relative quality of the first partial RM and the second partial RM. The first partial RM may be generated correspond to a geographical area and a second partial RM may be generated corresponding to the same geographical area, but after an interval of time, say one week. If a distance between an estimate of a location based upon the first partial RM and a reference position is less than a distance between an estimate of a location based upon the second partial RM and the reference position, the first partial RM may be determined to have a better quality compared to the second partial RM.

In some embodiments of the invention, a location estimate may be an average of several location estimates, each corresponding to a different list of APs. Two lists of APs may be different if even one AP is different between the two lists.

In an embodiment of the invention, the full RM location unit may provide an estimate of the location based upon signal from a GNSS, for example.

If desired, the different functions discussed herein may be performed in a different order and/or concurrently with each other. Furthermore, if desired, one or more of the above-described functions may be optional or may be combined.

FIG. 5 demonstrates how quality of two batches of partial radio maps may be compared, according to an embodiment of the invention. Data shown in FIG. 5 represents two batches of partial RMs, a first batch which was generated during week 40 of a year and a second batch which was generated during week 44 of the same year. Say, the current week is week 48 the year. Resultantly, position estimate availability with the partial RMs may be computed up to week 47. For the first batch, analysis can be made for a 7 week period starting from week 40 and ending in week 47 and for the second batch, analysis can be made for a 3 week period starting from week 44 and ending in week 47. Bar charts in FIG. 5 show a change in availability of partial RMs as they become outdated. For example, from the bar chart corresponding to the first batch or the week 40 batch, it can be seen that when the batch is 5 weeks old (week 45 in the first batch), availability of the partial RM drops by 15%. However, during the same week, a partial RM from the second batch shows a drop in availability of less than 10%. Hence, if an acceptable level of availability drop is 10% in a positioning system, for example, then from FIG. 5, it may be concluded that a new batch of partial RMs need to be generated every 4 weeks to meet the desired level of availability performance of the positioning system.

In an embodiment of the invention, a positioning client, such as the user terminal 102, for example, may implement the methods according to the invention.

In another embodiment of the invention, availability with a partial RM may be compared to availability with a full RM to determine a performance of the partial RM. For example, say availability with a partial RM is 60% and availability with a full RM is 62%. While availability with the partial RM is quite low in absolute terms, it still may be acceptable because availability with the full RM is 62%. If however, availability with the full RM is 90% and availability with a partial RM is 60%, then the partial RM likely needs to be updated.

Without in any way limiting the scope, interpretation, or application of the claims appearing below, a technical effect of one or more of the example embodiments disclosed herein is to reduce a number of times a partial RM needs to be downloaded by a user terminal. Another technical effect of one or more of the example embodiments disclosed herein is to replace an old partial RM with its new version only if the new version is significantly different from the old version.

Embodiments of the present invention may be implemented in software, hardware, application logic or a combination of software, hardware and application logic.

The software, application logic and/or hardware may reside on memory 307, the processor 301 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

We claim:

1. An apparatus, comprising:
a processor configured to determine a first result of estimating a position based at least in part on a first partial radio map;
the processor further configured to perform a first comparison of the first result to a reference position; and
a memory configured to store a second result based upon the first comparison,
the processor further configured to determine a third result of estimating the position based at least in part on a second partial radio map;
the processor further configured to perform a second comparison of the third result to the reference position; and
the processor further configured to determine a quality of the first partial radio map relative to a quality of the second partial radio map based at least in part on the first comparison and the second comparison.

2. The apparatus of claim 1, wherein if the first result is a valid estimate of the position, the second result is at least one of a difference between the first result and the reference position and an indication of whether the reference position is comprised within an uncertainty area of the first result or not.

3. The apparatus of claim 2, wherein the processor is further configured to cause transmission of a partial radio map to a user terminal based at least in part on at least one of the first result and the second result.

4. The apparatus of claim 1, wherein the second result is an indication of whether a valid estimate was obtained or not.

5. The apparatus of claim 1, wherein the first comparison comprises determining a first difference between the first result and the reference position; and wherein the second comparison comprises determining a second difference between the third result and the reference position.

6. The apparatus of claim 1, wherein the quality of the first radio map is determined to be better relative to the quality of the second radio map if the first result is a valid estimate of the position and the third result is not a valid estimate of the position.

7. The apparatus of claim 1, wherein the quality of the first radio map is determined to be better relative to the quality of the second radio map if a distance between the position estimated based upon the first partial radio map and the reference position is less than a distance between the position estimated based upon the second partial radio map and the reference position.

8. The apparatus of claim 1, wherein the processor is further configured to cause transmission of a partial radio map to a user terminal based at least in part on the quality of the first partial radio map relative to the quality of the second partial radio map.

9. The apparatus of claim 1, wherein the reference position is an estimate of the position based at least in part on at least one of a full radio map and a navigation satellite based system.

10. A method, comprising:
determining a first result of estimating a position based at least in part on a first partial radio map;
performing a first comparison of the first result to a reference position;
determining a third result of estimating the position based at least in part on a second partial radio map;
performing a second comparison of the third result to the reference position; and
determining a quality of the first partial radio map relative to a quality of the second partial radio map based at least in part on the first comparison and the second comparison.

11. The method of claim 10, wherein if the first result is a valid estimate of the position, the second result is at least one of a difference between the first result and the reference position and an indication of whether the reference position is comprised within an uncertainty area of the first result or not.

12. The method of claim 10, wherein the second result is an indication of whether a valid estimate was obtained or not.

13. The method of claim 10, further comprising:
causing transmission of a partial radio map to a user terminal based at least in part on the second result.

14. The method of claim 10, wherein the first comparison comprises determining a first difference between the first result and the reference position; and wherein the second comparison comprises determining a second difference between the third result and the reference position.

15. The method of claim 10, wherein the quality of the first radio map is determined to be better relative to the quality of the second radio map if the first result is a valid estimate of the position and the third result is not a valid estimate of the position.

16. The method of claim 10, wherein the quality of the first radio map is determined to be better relative to the quality of the second radio map if a distance between the position estimated based upon the first partial radio map and the reference position is less than a distance between the position estimated based upon the second partial radio map and the reference position.

17. The method of claim 10, wherein the processor is further configured to cause transmission of a partial radio map to a user terminal based at least in part on the quality of the first partial radio map relative to the quality of the second partial radio map.

18. The method of claim 10, wherein the reference position is an estimate of the position based at least in part on at least one of a full radio map and a navigation satellite based system.

19. A method, comprising:
determining a first result of estimating a position based at least in part on a first partial radio map;
determining a second result of estimating the position based at least in part on a second partial radio map; and
determining a quality of the first partial radio map relative to a quality of the second partial radio map based at least in part on the first result and the second result, wherein the first partial radio map is generated to correspond to a geographical area and the second partial radio map is generated corresponding to the same geographical area, but after an interval of time.

20. The method of claim 19, further comprising:
if the first result is a valid estimate of the position and the second result is an invalid estimate of the position, determining that the first partial radio map is of a better quality compared to the second partial radio map.

21. The method of claim 19, wherein the first partial radio map and the second partial radio map are based upon data belonging to different time periods.

* * * * *